United States Patent
Villanueva et al.

(10) Patent No.: US 7,216,684 B2
(45) Date of Patent: May 15, 2007

(54) PNEUMATIC AVIATION TIRE

(75) Inventors: Roel Domingo Villanueva, Hudson, OH (US); John Joseph Slivka, Danville, VA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 230 days.

(21) Appl. No.: 10/747,835

(22) Filed: Dec. 29, 2003

(65) Prior Publication Data

US 2005/0145315 A1 Jul. 7, 2005

(51) Int. Cl.
*B60C 9/20* (2006.01)
*B29D 30/16* (2006.01)
*B29D 30/38* (2006.01)

(52) U.S. Cl. ............... 152/531; 152/533; 156/117; 156/130

(58) Field of Classification Search ....... 156/117, 156/130; 152/531, 533
See application file for complete search history.

(56) References Cited

U.S. PATENT DOCUMENTS

| | | | |
|---|---|---|---|
| 3,608,605 A | 9/1971 | Cole | 152/361 |
| 5,007,974 A * | 4/1991 | Maathuis et al. | 156/117 |
| 5,115,853 A * | 5/1992 | Oare et al. | 152/527 |
| 5,205,882 A | 4/1993 | Ueyoko et al. | 152/527 |
| 5,223,061 A | 6/1993 | Navaux | 152/527 |
| 5,271,445 A | 12/1993 | Kohno et al. | 152/527 |
| 5,277,236 A * | 1/1994 | Takatsu et al. | 152/451 |
| 5,373,886 A | 12/1994 | Yamaguchi et al. | 152/531 |
| 5,385,190 A * | 1/1995 | Assaad et al. | 152/209.15 |
| 5,396,941 A * | 3/1995 | Iuchi | 152/527 |
| 5,427,167 A | 6/1995 | Watanabe et al. | 152/531 |
| 5,513,685 A | 5/1996 | Watanabe et al. | 152/531 |
| 5,535,801 A | 7/1996 | Iseki et al. | 152/528 |
| 5,593,523 A | 1/1997 | Suzuki et al. | 152/527 |
| 5,683,543 A | 11/1997 | Morikawa et al. | 152/527 |
| 5,730,814 A | 3/1998 | Morikawa et al. | 152/527 |
| 5,795,417 A * | 8/1998 | Damke et al. | 152/527 |
| 6,058,997 A | 5/2000 | Nishida et al. | 152/529 |
| 6,098,683 A | 8/2000 | Nakano | 152/527 |

(Continued)

FOREIGN PATENT DOCUMENTS

EP 0488734 6/1992

(Continued)

*Primary Examiner*—Geoffrey L. Knable
(74) *Attorney, Agent, or Firm*—Wood, Herron & Evans, L.L.P.

(57) ABSTRACT

Pneumatic tires for aircraft service having a belt package with shoulder reinforcement. The tire includes a belt reinforcing structure or belt package having multiple cut belts, multiple spiral wound belt layers positioned radially between the cut belts and the tread, and multiple spiral wound shoulder layers proximate the shoulder. The spiral wound belt layers and the spiral wound shoulder layers are formed by a continuous cord-reinforced strip having a strip width. The spiral wound belt layers are characterized by a first winding pitch of approximately one strip width per revolution and the spiral wound shoulder layers are characterized by a second winding pitch of less than one strip width per revolution. Alternatively, the spiral wound shoulder layers may be formed with a tiered arrangement by shifting the starting location for successive spiral wound belt layers laterally so that the side edges are not coincident.

10 Claims, 3 Drawing Sheets

U.S. PATENT DOCUMENTS

| | | |
|---|---|---|
| 6,125,900 A | 10/2000 | De Loze de Plaisance, et al. .......................... 152/531 |
| 6,374,890 B1 | 4/2002 | Nakano ...................... 152/527 |
| 6,520,232 B1 | 2/2003 | Miyazaki et al. ........... 152/527 |
| 2002/0026979 A1* | 3/2002 | Tanaka .................... 156/130.7 |
| 2004/0089392 A1* | 5/2004 | Yukawa et al. ............. 152/533 |

FOREIGN PATENT DOCUMENTS

| | | |
|---|---|---|
| EP | 0504698 | 9/1992 |
| EP | 0850788 | 7/1998 |
| JP | 5-270211 | 10/1993 |
| JP | 08-156513 | 6/1996 |
| JP | 10-193915 | 10/2000 |

* cited by examiner

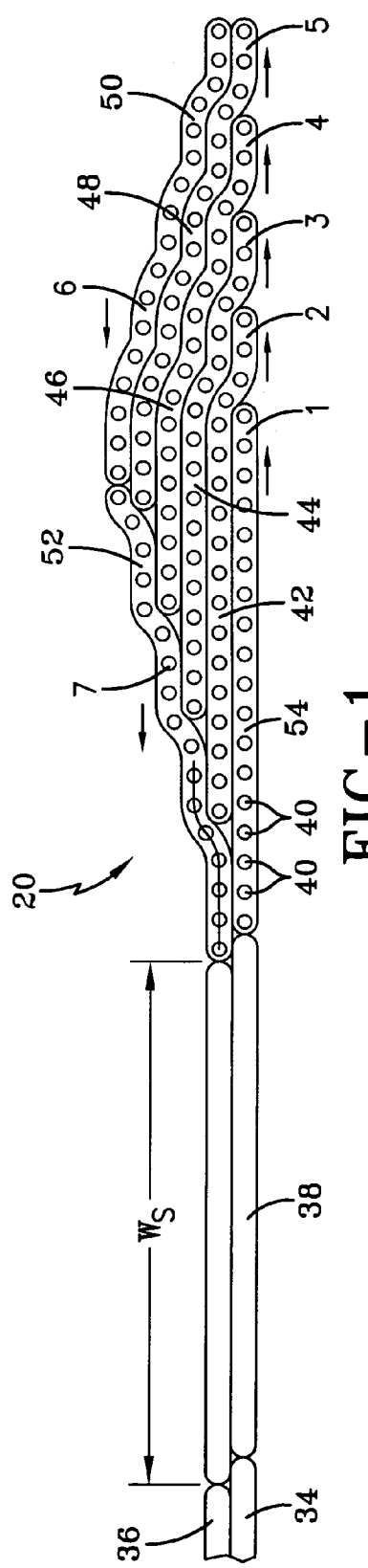
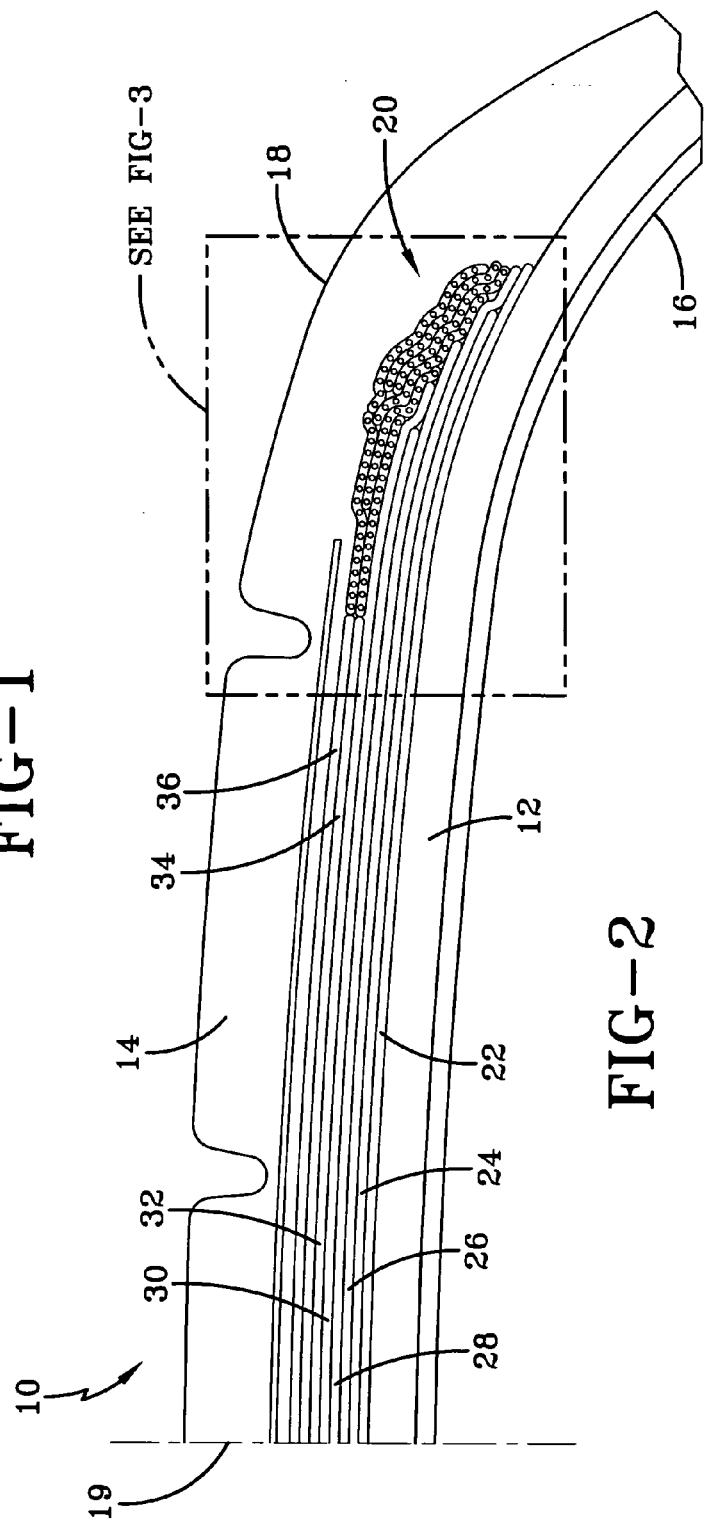

PNEUMATIC AVIATION TIRE

FIELD OF THE INVENTION

The present invention generally relates to pneumatic tires and, more specifically, to pneumatic aviation tires for aircraft service having shoulder reinforcement.

BACKGROUND OF THE INVENTION

Pneumatic aviation tires for service on aircraft landing gears are exposed to severe operating conditions of load and acceleration. In particular, pneumatic aviation tires married with the landing gears of large commercial airliners are susceptible to severe deformation upon landing, takeoffs, and controlled movement of the aircraft under its own power while on the ground (e.g., taxiing). Loss of a landing gear tire on takeoff (e.g., a blowout) may result in an aborted take-off or an emergency landing. Loss of a tire on the landing gear upon landing may result in an inability to halt the airliner's momentum, leading to runway overshoot. Airliners often elevate tire temperature by taxiing long distances and/or by taxiing fast, which may increase the susceptibility to blowouts during takeoff or after landing.

Typically, the belt package incorporated into conventional aviation pneumatic tires includes a number of cut belt layers and a number of spiral wound layers formed from cord reinforced strip(s) wound about the circumference of the tire with a zero degree spiral overlay. The spiral wound layers terminate proximate the tire shoulder with no overlap as the winding direction is reversed to apply the successive spiral wound layers.

One conventional approach for improving tire durability is increase the number of belt layers uniformly from crown to shoulder. However, this approach results in significant tire weight increases. The tire weight increase from the added layers is contrary to another tire design parameter for minimizing the net weight of the airliner. Increasing the number of belt layers uniformly between the crown and the shoulder also significantly increases the tire's production cost.

For these and other reasons, it would be desirable to provide a lightweight pneumatic tire for airliner landing gears characterized by improved durability and greater load-carrying capability.

SUMMARY OF THE INVENTION

The invention is directed to pneumatic tires for aircraft service that includes a carcass, a tread disposed radially outward of the carcass, a sidewall intersecting the tread at a shoulder, and a belt reinforcing structure positioned radially between the carcass and the tread. The belt reinforcing structure or belt package includes a plurality of cut belts, a plurality of spiral wound belt layers positioned radially between the plurality of cut belts and the tread, and a plurality of spiral wound shoulder layers overlapping the plurality of cut belts proximate the shoulder. The plurality of spiral wound belt layers and the plurality of spiral wound shoulder layers are formed by a continuous cord-reinforced strip having a strip width. The plurality of spiral wound belt layers are characterized by a first winding pitch of approximately one strip width per revolution and the plurality of spiral wound shoulder layers are characterized by a second winding pitch of less than one strip width per revolution.

In another embodiment, a pneumatic tire includes a carcass having an equatorial plane, a tread disposed radially outward of the carcass, a sidewall intersecting the tread at a shoulder, and a belt reinforcing structure positioned radially between the carcass and the tread. The belt reinforcing structure or belt package includes a plurality of cut belts and a plurality of spiral wound belt layers positioned radially between the plurality of cut belts and the tread. The spiral wound belt layers overlap the plurality of cut belts proximate the shoulder. The plurality of spiral wound belt layers is formed by a continuous cord-reinforced strip having a strip width in which adjacent pairs of the plurality of spiral wound belt layers are displaced laterally relative to the equatorial plane by a shift distance of less than one strip width for defining a plurality of overlapping spiral wound shoulder layers proximate the shoulder.

The pneumatic tires of the invention have an improved dynamic performance produced by adding reinforcement in the cut belt edge/shoulder tire region using a zero degree spiral overlay. The reinforcement is provided by building up the cut belt edge/shoulder region by adding overlaid spiral wound strips or spiral layers that cover the cut belt transverse edges. The additional spiral wound strips are applied by reducing the pitch of the spiral with which the spiral wound strip is being applied so that the individual turns of the strip are overlapping in the shoulder region, which differs from conventional spiral wound layers that are non-overlapping in the shoulder region. The pneumatic tires of the invention are stiffer in the shoulder region due to the presence of the additional spiral layers and have increased burst strength. The pneumatic tires of the invention achieve the improvement in dynamic performance and the stiffening without adding significant weight to the as tire, as compared with the conventional approach of increasing the number of belt layers uniformly from the crown to the shoulder.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 1 is a diagrammatic view of a belt package of the invention providing shoulder reinforcement in an aircraft nose gear tire.

FIG. 2 is a cross-sectional view of a pneumatic tire of an embodiment of the invention incorporating the belt package of FIG. 1.

DEFINITIONS

"Axial" and "axially" means the lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Cord" means one of the reinforcement strands of which the plies in the tire are comprised.

"Crown" refers to substantially the outer circumference of a tire where the tread is disposed.

"Circumferential" means circular lines or directions extending along the surface of the sidewall perpendicular to the axial direction.

"Cut belt or cut breaker reinforcing structure" means at least two cut layers of plies of parallel cords, woven or unwoven, underlying the tread, unanchored to the bead, and having both left and right cord angles in the range from 10 degrees to 33 degrees with respect to the equatorial plane of the tire.

"Equatorial plane (EP)" means the plane perpendicular to the tire's axis of rotation and passing through the center of its tread.

"Inner" means toward the inside of the tire.

"Lateral" means a direction parallel to the axial direction, as in across the width of the tread or crown region.

"Outer" means toward the tire's exterior.

"Pneumatic tire" means a laminated mechanical device of generally toroidal shape, usually an open-torus having beads and a tread and made of rubber, chemicals, fabric and steel or other materials.

"Radial" and "radially" mean directions radially toward or away from the axis of rotation of the tire.

"Shoulder" means the upper portion of the sidewall just below the tread edge.

"Sidewall" means that portion of a tire between the tread and the bead area.

"Tread" means a molded rubber component which, when bonded to a tire casing, includes that portion of the tire that comes into contact with the road when the tire is normally inflated and under normal load.

DETAILED DESCRIPTION

Figure 3:
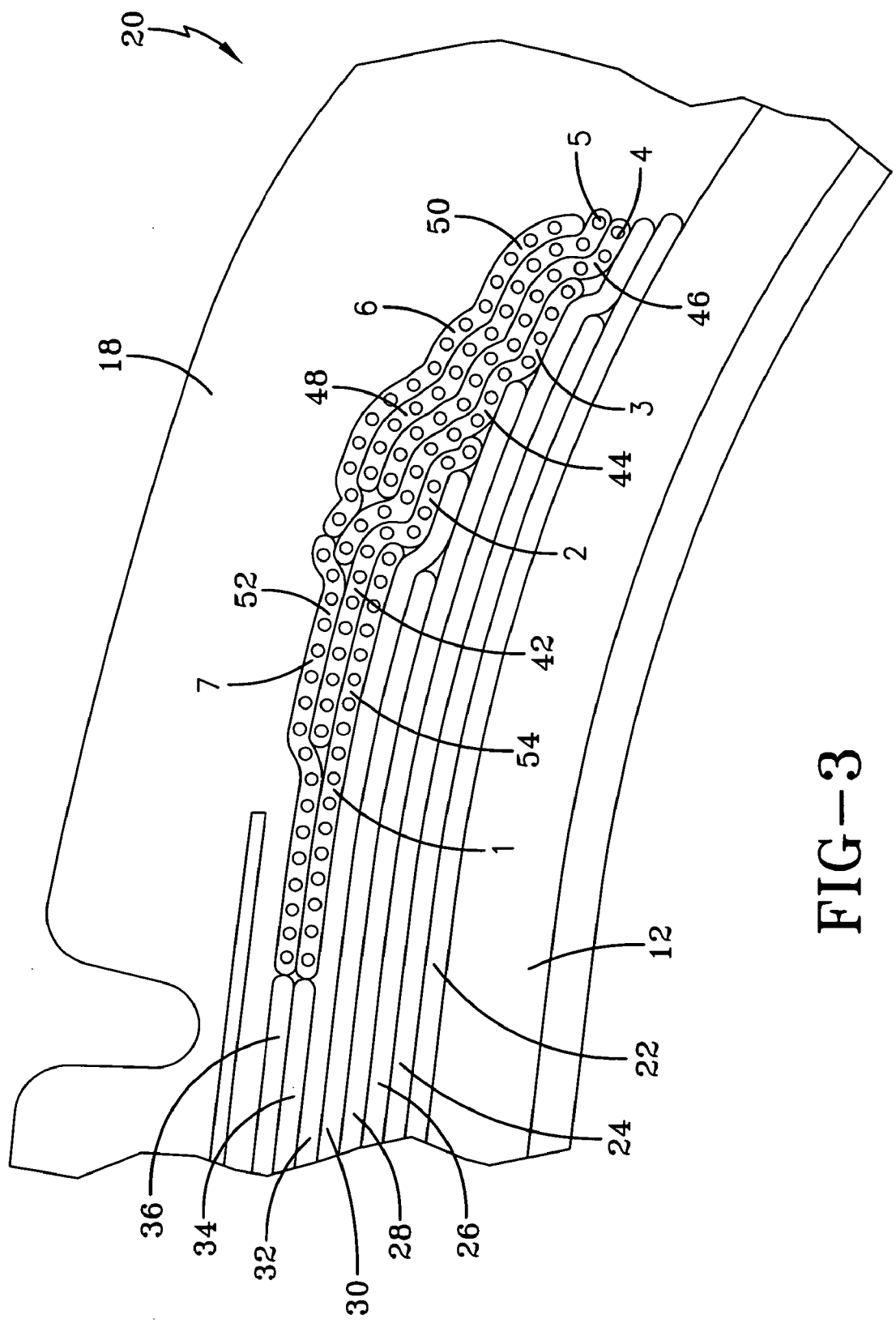
FIG. 3 is an enlarged view of a portion of FIG. 2.

With reference to FIGS. 1–3, a pneumatic aviation tire 10 suitable for airliner service as a nose gear tire includes a carcass 12, a ground-engaging tread 14, a sidewall 16, and a shoulder 18 defined at the juncture between the sidewall 16 and the tread 14. When mounted on the nose gear wheel of an airliner, the tread 14 furnishes traction and tire 10 contains a fluid that sustains the airliner load. Pneumatic aviation tire 10 is understood to have mirror symmetry for reflection about an equatorial plane 19 bisecting tire 10. Arranged between the carcass 12 and the tread 14 is a belt package, generally indicated by reference numeral 20, characterized by a plurality of, for example, six individual cut belt plies or layers 22, 24, 26, 28, 30, and 32 and a plurality of, for example, two spiral wound belt layers 34, 36 positioned radially-outward from the cut belt layers 22, 24, 26, 28, 30 and 32. The number of cut belt layers and spiral wound layers in the belt package 20 may vary according to the tire construction.

As best shown in FIGS. 1 and 3, each of the spiral wound belt layers 34, 36 is formed by a continuous rubberized flat strip 38 that is wound circumferentially (i.e., with a zero degree spiral overlay) about the tire 10 and that extends between the tire shoulders 18. Strip 38 is reinforced with multiple embedded high modulus, essentially inextensible cords 40 of, for example, nylon, rayon, polyester, aramid, glass, or metal disposed spatially with a substantially parallel arrangement to one another and covered by a elastomer matrix, such as a cured rubber casing. The strip width of strip 38 ranges from about 6 mm to about 20 mm, typically about 10 mm, the thickness of strip 38 is approximately of several millimeters, and the number of cords 40 per inch is typically in the range of 18 to 22. During construction of tire 10, the strip 38 is wound circumferentially about a crowned building drum with the strip 38 being shifted by a transverse distance approximately equal to, or slightly greater than, the strip width Ws with each individual turn.

The transverse dimensions of the cut belt layers 22, 24, 26, 28, 30 and 32 are selected such that their corresponding lateral side edges are tiered or staggered with an overlapping relationship near the shoulder 18. For example, cut belt layers 22 and 26 extend laterally for a greater lateral distance from the equatorial plane 19 than cut belt layer 24 so that the terminal side edge of cut belt layer 24 is covered by the overlap between layers 22 and 26.

A plurality of overlapping spiral wound shoulder layers 42, 44, 46, 48, 50, 52 and 54 are provided in the shoulder 18 of the tire 10. Each of the spiral wound shoulder layers 42, 44, and 46 is defined by a single circumferential turn of strip 38 in which adjacent turns are shifted laterally by less than one strip width (Ws) so that the shoulder layers 42, 44, and 46 have a partially overlapping or staggered relationship. In other words, the winding pitch for spiral wound shoulder layers 42, 44, and 46 is less than one (1) strip width per revolution. The remaining spiral wound shoulder layers 48, 50, 52, and 54 are applied with a winding pitch equal to one strip width per revolution such that there is no overlapping build up in the tire crown region beyond the overlap afforded by spiral wound belt layers 34, 36. The lateral shift of less than one strip width is apparent in FIGS. 1–3 as adjacent turns of strip 38 contribute to the partially overlapping relationship. In a central region of the shoulder 18, an overlapping relationship is established to provide an ultimate thickness equal to six strip thicknesses.

To apply the spiral wound shoulder layers 42, 44, 46, 48, 50, 52 and 54 and with continued reference to FIGS. 1–3, the first spiral wound belt layer 34 is applied to the tire 10. After shoulder layer 54 is applied, the winding pitch is changed from greater than or equal to one strip width per revolution (i.e., a zero degree pitch) to a winding pitch that is less than one (1) strip width per revolution. In the exemplary embodiment depicted in FIGS. 1–3, the spiral wound shoulder layers 42, 44, and 46 are shifted laterally by approximately 0.2 of a strip width per revolution. The spiral wound shoulder layers 42, 44, and 46 are applied serially or sequentially from left to right, as best visible in FIG. 1. Spiral wound shoulder layers 48 and 50 are applied with a winding pitch of approximately zero so that shoulder layers 48, 50 roughly overlap shoulder layer 48. Then, the winding pitch is reverted to greater than or equal to one strip width per revolution. Spiral wound shoulder layer 52 is applied with the unitary winding pitch of one strip width, in an opposite or reverse winding direction from shoulder layers 42, 44, and 46. After shoulder layer 52 is applied, the circumferential turns of strip 38 transition into forming the spiral wound belt layer 36. At the opposite shoulder 18, another set of spiral wound shoulder layers (not shown but similar to spiral wound shoulder layers 42, 44, 46, 48, 50, and 52) is applied to tire 10.

Figure 4:
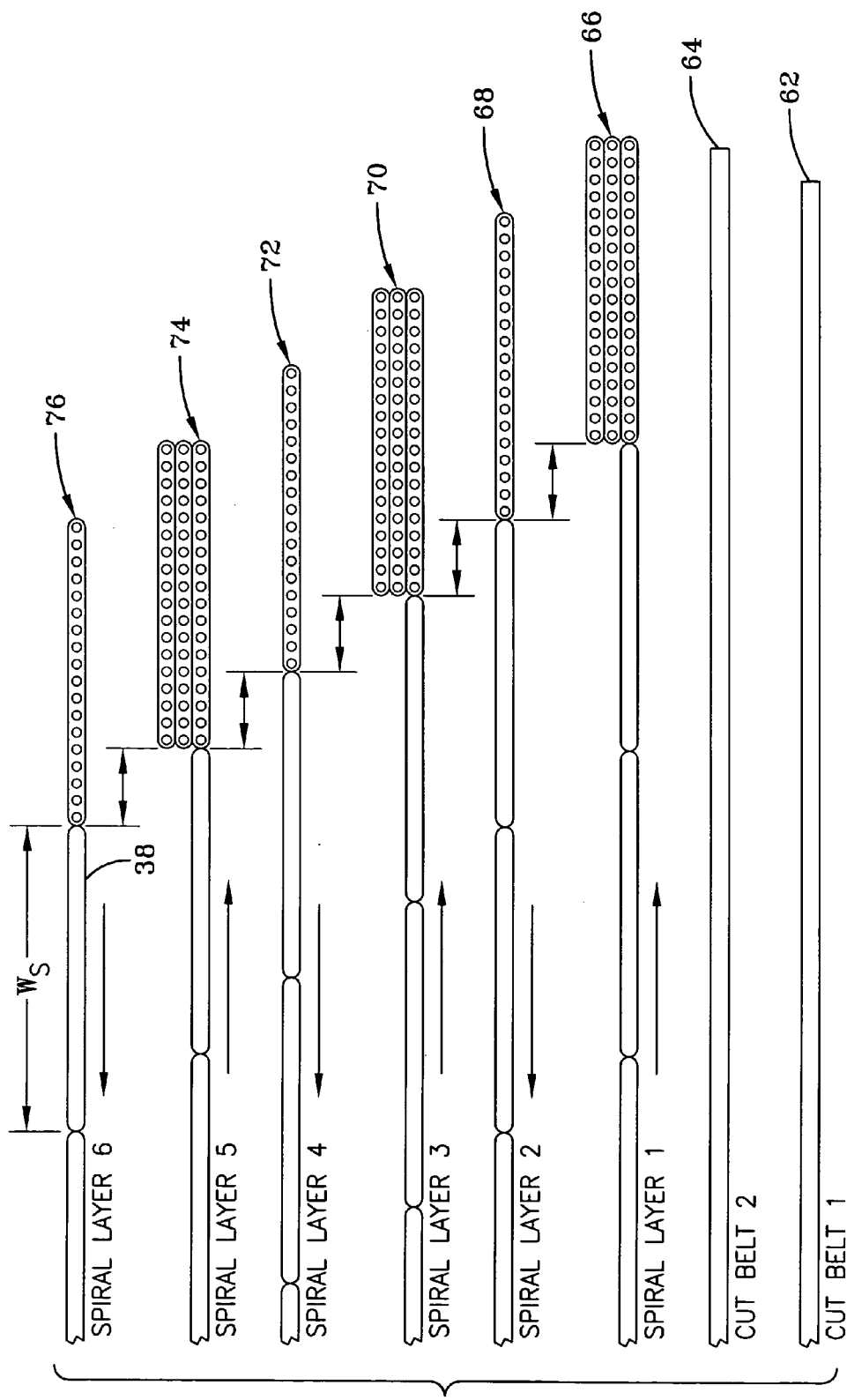
FIG. 4 is a diagrammatic view of a belt package in accordance with an alternative embodiment of the invention.

With reference to FIG. 4 and in an alternative embodiment of the invention, a belt package 60 for an aviation pneumatic tire (not shown but similar to tire 10 (FIGS. 2 and 3)) includes a plurality of cut belts 62, 64 and a plurality of spiral wound belt layers 66, 68, 70, 72, 74, and 76 wound with a zero degree spiral. The laterally outermost turn of spiral wound belt layer 66 is aligned radially with the free side edge of the underlying cut belt 64. The laterally outermost turn of spiral wound belt layer 68 is shifted laterally by less than one strip width, although the winding pitch remains constant at greater than or equal to about one strip width. Each successive spiral wound belt layer 70, 72, 74, and 76 is likewise shifted laterally by less than one strip width, although the winding pitch remains constant at greater than or equal to about one strip width. In other words, when the winding direction is reversed at the turn around positions at each tire shoulder 18 (FIG. 1), the initial strip turn of each spiral wound belt layer 66, 68, 70, 72, 74, and 76 is shifted laterally by less than one strip width so that radially adjacent pairs of spiral wound belt layers 66, 68, 70, 72, 74, and 76 are only partially overlapping. Alternating spiral wound belt layers, for example spiral wound belt layers 66, 68, 72, may include multiple overlapping initial turns of strip 38 wound with a zero pitch, although the invention is not so limited. In the exemplary embodiment, two cut belts and six spiral wound belt layers are provided in the belt package 60, and wherein the shift distance for successive spiral wound belt layers is about 0.33 of the strip width.

The overlapping turns of strip 38 at the lateral edge of the spiral wound belt layers creates a tiered arrangement virtue the lateral shift in the starting location for successive spiral wound belt layers 66, 68, 70, 72, 74, and 76 so that the side edges among successive spiral wound belt layers 66, 68, 70, 72, 74, and 76 are not coincident. Spiral wound belt layer 66 contributes three overlapping spiral wound shoulder layers, spiral wound belt layer 68 contributes one partially overlapping spiral wound shoulder layer, spiral wound belt layer 70 contributes three partially overlapping spiral wound shoulder layers, etc.

The pneumatic tires 10 of the invention have been observed to comply with the performance standards of Technical Standard Order (TSO) C62d issued by the Federal Aviation Administration without increasing the number of belt layers across the full tire width. As a result, the requisite performance standard may be achieved with fewer full-width belt layers by adding spiral wound shoulder layers in accordance with the principles of the invention, which serves to provide a lighter tire also having standard-complaint performance. More specifically, the spiral wound shoulder layers of the invention provide standard-compliant performance while permitting a reduction in the number of belt layers.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A pneumatic tire comprising:
   a carcass;
   a tread disposed radially outward of said carcass, said tread including an equatorial plane;
   a sidewall including a shoulder that intersects said tread; and
   a belt reinforcing structure positioned radially between said carcass and said tread, the belt reinforcing structure including a plurality of cut belts extending axially into said shoulder, a plurality of overlapping spiral wound belt layers positioned radially between said plurality of cut belts and said tread, and a plurality of spiral wound shoulder layers overlapping at least a portion of said plurality of cut belts in said shoulder, said plurality of spiral wound belt layers and said plurality of spiral wound shoulder layers formed by a continuous cord-reinforced strip having a strip width, each spiral wound belt layer of said plurality of spiral wound belt layers characterized by a first winding pitch of greater than or equal to one strip width per revolution, and said plurality of spiral wound shoulder layers characterized by a second winding pitch of less than one strip width per revolution.

2. The pneumatic tire of claim 1 wherein said plurality of spiral wound shoulder layers includes four spiral wound shoulder layers.

3. The pneumatic tire of claim 2 wherein the second winding pitch is about 0.2 of a strip width per revolution.

4. The pneumatic tire of claim 1 wherein the second winding pitch is about 0.2 of a strip width per revolution.

5. The pneumatic tire of claim 1 wherein said belt reinforcing structure includes six cut belt layers and two spiral wound belt layers.

6. The pneumatic tire of claim 5 wherein at least two of said spiral wound shoulder layers are applied with a second winding pitch of about zero.

7. The pneumatic tire of claim 1 wherein said plurality of spiral wound belt layers and said plurality of spiral wound shoulder layers are wound with a zero degree spiral overlay.

8. A method of reinforcing first and second shoulders of a pneumatic tire, comprising:
   applying a plurality of cut belt layers to a carcass;
   winding a cord-reinforced strip circumferentially about the plurality of cut belt layers with a first winding pitch in an axial direction greater than or equal to one strip width to form a first spiral wound belt layer extending from the second shoulder to the first shoulder;
   winding the cord-reinforced strip with a second winding pitch in the axial direction less than one strip width proximate the first shoulder of the tire for applying a first plurality of overlapping spiral wound shoulder layers at in the first shoulder having a partially overlapping relationship with a first lateral free edge of said cut belt layers;
   winding the cord-reinforced strip circumferentially about the first spiral wound belt layer at the first winding pitch to form a second spiral wound belt layer extending from the first shoulder to the second shoulder; and
   winding the cord-reinforced strip with the second winding pitch proximate in the second shoulder of the tire for applying a second plurality of overlapping spiral wound shoulder layers having a partially overlapping relationship with a second lateral free edge of said cut belt layers.

9. The method of claim 8 wherein the second winding pitch is about 0.2 of a strip width per revolution.

10. The method of claim 8 wherein said spiral wound belt layers and said plurality of spiral wound shoulder layer are wound with a zero degree spiral overlay.

* * * * *

UNITED STATES PATENT AND TRADEMARK OFFICE
CERTIFICATE OF CORRECTION

PATENT NO. : 7,216,684 B2
APPLICATION NO. : 10/747835
DATED : May 15, 2007
INVENTOR(S) : Villanueva et al.

Page 1 of 1

It is certified that error appears in the above-identified patent and that said Letters Patent is hereby corrected as shown below:

Column 2, line 31, after "the" delete "as".

Column 5:
Line 18, after "arrangement" insert --by--.
Line 19, before "the lateral" insert --of--.
Line 44, change "applicant" to --applicants--.

Claim 8:
Column 6, line 43, after "at" delete "in".
Column 6, line 51, after "proximate" delete "in".

Claim 10, column 6, line 59, change "layer" to --layers--.

Signed and Sealed this

Fourteenth Day of August, 2007

JON W. DUDAS
*Director of the United States Patent and Trademark Office*